Figure 1:
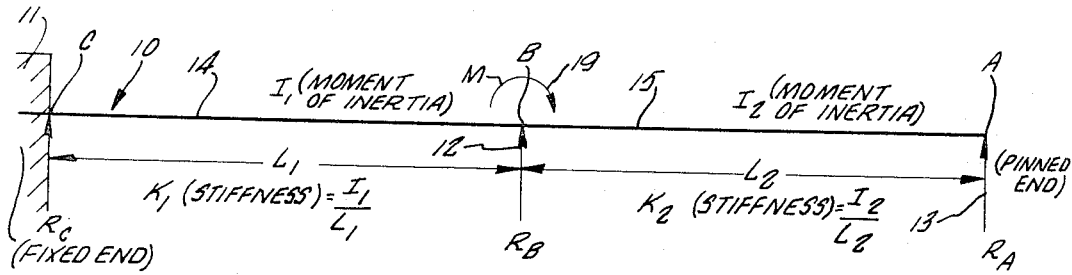

Aug. 8, 1967   T. H. CARTER   3,335,267
ANALOG CIRCUIT FOR SIMULATING AND THEN CALCULATING THE FORCES
ON A STRUCTURE HAVING FIXED OR PINNED JOINTS
Filed June 10, 1963

INVENTOR.
TRULAND H. CARTER
BY
Christie, Parker & Hale
ATTORNEYS.

United States Patent Office 3,335,267
Patented Aug. 8, 1967

3,335,267
ANALOG CIRCUIT FOR SIMULATING AND THEN CALCULATING THE FORCES ON A STRUCTURE HAVING FIXED OR PINNED JOINTS
Truland H. Carter, 20025 Squire Drive,
Covina, Calif. 91722
Filed June 10, 1963, Ser. No. 286,683
4 Claims. (Cl. 235—184)

This invention provides an electrical circuit for automatically calculating the physical relationships between individual elements joined together to form a complex system.

The circuit is useful in several fields of engineering, such as structural, civil, fluid mechanics, and electronics. As an example in structural engineering, the circuit is used to calculate electrically the internal forces in all members of a structure, such as buildings, towers, bridges, aircraft frames, missile frames, etc. Similarly, in fluid mechanics, the circuit determines for simple or complicated systems the most efficient sizes of pipes or ducts for handling air or gases. The circuit duplicates electrically a mathematical process known as "moment distribution" in structural engineering. Such calculations are well known, and are described in detail in text books, such as "Statically Indeterminate Structure," by L. C. Maugh, pp. 62–68, published in 1946 by John Wiley & Sons, Inc., New York.

Although the circuit of the invention has wide application, it is described with specific reference to duplicating the mathematical process known as "moment of distribution" in structural engineering.

A typical modern building is made up of continuous beams with fixed and pinned joints throughout the structure. Depending on the loading applied to the building, unbalanced moments are developed at certain joints in the structure. Ordinarily, the unbalanced moments must be calculated or estimated so the building can be designed with a sufficient safety factor. Many times the calculations are so complex and time-consuming that the building is simply grossly over-designed to insure adequate safety. This procedure is undesirable, because it involves guesswork, and often results in unnecessarily high construction costs due to over-design.

The circuit of this invention automatically calculates electrically the distribution of moments throughout a complex structure, thereby saving time otherwise required for tedious calculations, and making it practical to construct a building with an adequate, but not an excessive, margin of safety to effect considerable savings in building costs.

Briefly, the circuit includes a plurality of electrical impedances connected in parallel. Each parallel-connected impedance has a value inversely proportional to the stiffness of a respective span in a structure made up of continuous members, such as beams, columns, etc., with fixed or pinned joints at the ends of adjacent spans. For the purpose of describing this invention, the term "fixed joint" means a joint at which a beam is either continuous over a support point, or else is rigidly fixed to another beam or to a support, such as the earth, or a foundation. The term "pinned joint" means a joint at which a beam is discontinuous and not rigidly attached to another beam or a foundation, or the like.

One terminal of a two-terminal source of electrical power of a value proportional to an unbalanced fixed end moment around one of the joints of the structure under analysis is connected to a point between the two parallel-connected impedances which represent the spans in the structure on opposite sides of the said joint. A common electrical lead is connected to the other terminal of the source of electrical power and the ends of the parallel-connected impedances remote from the said one terminal of the source. A separate impedance is connected at one end to the common lead, and at the other end to an intermediate point of each parallel-connected impedance which represents a span having fixed joints at each end. Means are provided for sensing the current delivered by the source to the circuit, and means are also provided for sensing the current flowing through parallel-connected impedances.

Preferably, the impedances in the circuit are adjustable, and each of the group of impedances representing a particular span are ganged together so that they are adjusted simultaneously in the same direction and by the same amount. Preferably, each separate impedance is connected to the common lead and to the midpoint of a respective parallel-connected impedance, and has a value equal to one-half the total value of the respective parallel-connected impedance.

A separate switch is provided for connecting and disconnecting each said separate impedance in the circuit so that the electrical circuit can easily be set to duplicate structures with various arrangements of fixed and pinned joints.

Figure 2:
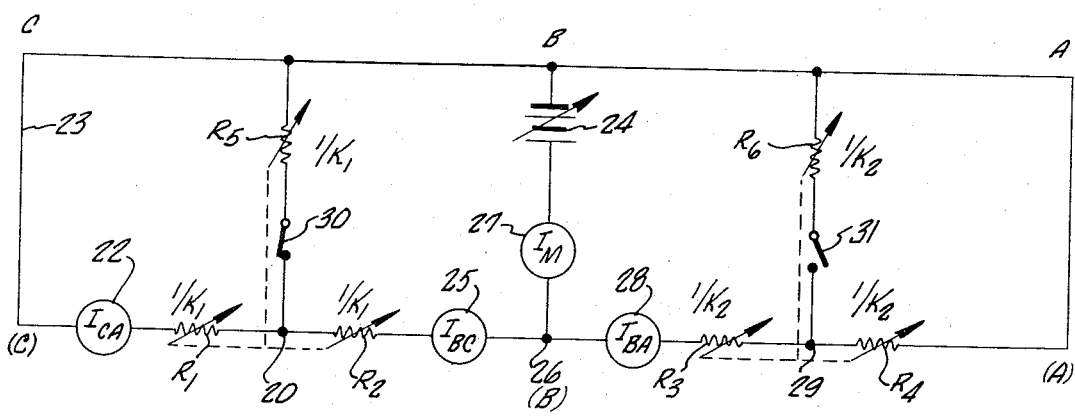

These and other aspects of the invention will be more fully understood from the following detailed description and the accompanying drawing in which:

FIG. 1 is a schematic diagram of a structure to be analyzed with the circuit of this invention; and FIG. 2 is a schematic diagram of the presently preferred basic form of the circuit of this invention.

Referring to FIG. 1, an elongated continuous horizontal beam 10 is rigidly attached at its left end to an abutment 11. The beam is supported at its center on a central vertical column 12 and at its right end by a right end vertical column 13. The beam thus includes a first span 14 between the fixed abutment and the central column, and a second span 15 between the central column and the right end column 13. The right end of span 15 is discontinuous at column 13 to form a pinned joint A. Since the beam is continuous over central column 12, a fixed joint B is formed between spans 14 and 15. Since the left end of span 14 is embedded in abutment 11, a fixed joint C is formed at the left end of span 14. The first span has a length $L_1$ and a moment of inertia $I_1$. The second span has a length $L_2$ and a moment of inertia $I_2$. The vertical reaction of the supports up against the beam at the right end column, the central column, and the abutment are $R_A$, $R_B$, and $R_C$, respectively.

The "stiffness" of the first span, as the term is used in structural engineering calculations, is $K_1$, and is equal to the moment of inertia of the first span divided by its length. The stiffness of the second span is $K_2$, and is equal to $I_2$ over $L_2$.

M, as indicated by the arrow 19 over the central column, is the unbalanced fixed end moment at the fixed joint B, and is calculated by relatively simple and well known techniques by taking the difference in the fixed end moments of the adjoining spans, which are calculated by simple well known equations. However, the problem is to determine the distribution of the unbalanced fixed end moment at the fixed joint B throughout the structure, as well as determining the distribution of the other unbalanced fixed end moments which may exist at the other joints.

The final moments in the spans can be calculated in accordance with the following conventional equations, using the "moment area" method as described in "Elements of Strengths of Materials," by Timoshenka and McCullough, pp. 205–208, published in 1943 by D. Van Nostrand Co., Inc., New York.

(1)
$$\frac{R_A L_2^2}{3K_2}+\frac{R_A L_2^2}{K_1}+\frac{R_A L_1 L_2}{2K_1}+\frac{R_A L_1 L_2}{2K_1}+\frac{R_A L_1^2}{3K_1}+\frac{R_B L_1 L_2}{2K_1}+\frac{R_A L_1^2}{3K_1}-\frac{ML_2}{K_1}-\frac{ML_1}{2K_1}=0$$

(2)
$$\frac{R_A L_1}{I_1}\times\frac{L_1}{2}\times\frac{2L_1}{3}+\frac{R_A L_2}{I_1}\times\frac{L_1^2}{2}+\frac{R_A L_1}{I_1}\times\frac{L_1}{2}\times\frac{2L_1}{3}-\frac{ML_1^2}{2I_1}=0$$

(2A) $$\frac{R_A L_1^2}{3K_1}+\frac{R_A L_1 L_2}{2K_1}+\frac{R_B L_1^2}{3K_1}-\frac{ML_1}{2K_1}=0$$

(2B) $$R_B=\frac{3M}{2L_1}-R_A\left[1+\frac{3L_2}{2L_1}\right]$$

(3) $$R_A=\frac{3K_2 M}{4L_2 K_1+3L_2 K_2}$$ (From combining Equations 1 and 2B)

(4) $$M_{BA}=R_A L_2$$

(4A) $$M_{BA}=\frac{M}{1+\frac{4K_1}{3K_2}}$$

(5) $$M_{BC}=M-M_{BA}$$

(6) $$M_{BC}=\frac{M}{1+\frac{3K_2}{4K_1}}$$

(7) $$M_{CB}=R_A[L_1+L_2]+R_B L_1-M$$

(8) $$M_{CB}=\frac{M_{BC}}{2}$$

In Equations 4, 6, and 8, above, $M_{BA}$ is the internal moment in the beam just to the right (as viewed in FIG. 1) of joint B; $M_{BC}$ is the internal moment just to the left of joint B; and $M_{CB}$ is the internal moment just to the right of joint C.

Referring to FIG. 2, variable resistors $R_1$ and $R_2$ are electrically connected at a point 20. The end of $R_1$ remote from point 20 is connected through a first ammeter 22 to a common electrical lead 23, which is connected to the negative terminal of a D.C. power source 24 having a voltage E. The end resistor $R_2$ remote from point 20 is connected through a second ammeter 25 to a distribution point 26, which corresponds to joint B in FIG. 1. A third ammeter 27 has one terminal connected to the positive terminal of the electrical source 24 and the other terminal connected to point 26. One terminal of a fourth ammeter 28 is connected to distribution point 26, and its other terminal is connected to one end of a variable resistor $R_3$. A variable resistor $R_4$ and resistor $R_3$ are connected at a common point 29. The end of resistor $R_4$ remote from point 29 is connected to the common lead 23. A variable resistor $R_5$ is connected at one end to common lead 23 and at its opposite end through a closed switch 30 to point 20 between resistors $R_1$ and $R_2$.

A variable resistor $R_6$ is connected at one end to the common lead 23 and its other end to an open switch 31, which may be closed when desired to connect the resistor to point 29 between resistors $R_3$ and $R_4$.

Preferably, resistors $R_1$, $R_2$, and $R_5$ are ganged together, are equal in value, and are each equivalent to the reciprocal of the stiffness of the span between support joints B and C in the structure shown in FIG. 1. Resistors $R_3$, and $R_4$, are equal in value, and preferably are each equivalent to the stiffness of the span between points A and B in the structure shown in FIG. 1. $R_6$ is equal in value to resistors $R_3$, or $R_4$, but is removed from the circuit by open switch 31 because joint A is pinned rather than fixed. If joint A were fixed, switch 31 would be closed to put resistors $R_6$ in the circuit. Conversely, if joint C were pinned rather than fixed, or continuous, switch 30 would be open to remove resistor $R_5$ from the circuit. Resistors $R_3$, $R_4$, and $R_6$ are also preferably ganged together, so that as the value of one is changed, the others are kept equal to it.

Resistors $R_1$ and $R_2$ form an impedance which represents span 14 between joints B and C in FIG. 1, and are connected in parallel with resistors $R_3$ and $R_4$, which represent span 15 between joints A and B.

The current flowing through the first, second, third, and fourth ammeters is designated $I_{CB}$, $I_{BC}$, $I_M$, and $I_{BA}$, respectively. Letting R equal the resistance of the entire circuit, the current flowing through the circuit is calculated as follows (where $R_1$, $R_2$, and $R_5$ equal $1/K_1$, the reciprocal of stiffness of span 14, and $R_3$, $R_4$, and $R_6$ equal $1/K_2$, the reciprocal of the stiffness of span 15):

(9) $$R=\frac{[2/K_2][1/K_1+1/2K_1]}{3/K_2+3/2K_1}=\frac{3/K_1 K_2}{2/K_2+3/2K_1}$$

(10) $$E=I_M R=\frac{3I_M}{2K_1+\frac{3K_2}{2}}$$

(11) $E=I_{BA}R_{BA}$ where $R_{BA}$ is resistance between B and A

(12) $$E=2/K_2\times I_{BA}=\frac{3I_M}{2K_1+\frac{3K_1}{2}}$$ (From combining Equations 10 and 11)

(13) $$I_{BA}=\frac{I_M}{1+\frac{4K_1}{3K_2}}$$ therefore $I_{BA}=M_{BA}$ where $I_M=M$

(14) $E=I_{BC}R_{BC}=3/2K_1\times I_{BC}$ where $R_{BC}$ is the resistance between B & C

(15) $$3/2K_1\times I_{BC}=\frac{3I_M}{2K_1+\frac{3K_2}{2}}$$ (From combining Equations 10 and 14)

(16) $$I_{BC}=\frac{I_M}{1+\frac{3K_2}{4K_1}}$$ therefore $I_{BC}=M_{BC}$ where $I_M=M$

(17) $$I_{CB}=\frac{I_{BC}}{2}$$

From the above, it can be seen that when the electrical source is set so that the current flowing through ammeter 27 is equal or equivalent to the unbalanced fixed end moment M at joint B, then the internal distribution of the unbalanced fixed end moment in the span is determined immediately by the current flowing through the first, second, and fourth ammeters.

The distribution computer circuit shown in FIG. 2 is operated to analyze the structure shown in FIG. 1 as follows:

(1) The stiffness of each span, $K_1$ and $K_2$, is calculated by dividing the moment of inertia of each span by its length:

$$K_1=\frac{I_1}{1}$$

$$K_2=\frac{I_2}{2}$$

(2) The reciprocal values of the stiffness are calculated. Resistors $R_1$, $R_2$, and $R_5$ are each set to equal $1/K_1$, and resistors $R_3$, $R_4$, and $R_6$ are each set to equal $1/K_2$. Since the values are relative, multiply or divide each by the same factor to facilitate setting of the resistors shown in FIG. 2.

(3) M is calculated by taking the difference in the fixed end moments of the adjoining spans, as follows:

$$M_{BA} = \frac{W_1 L_2^2}{12}$$

$$M_{BC} = \frac{W_2 L_1^2}{12}$$

$$M = M_{BA} - M_{BC}$$

(4) The electrical source is set to apply current through the third ammeter. The actual amount of current or voltage to be applied is not important, since the final distribution of the fixed end moment at joint B may be obtained by using the ratio of the unbalanced fixed end moment at joint B to the current flowing through the third ammeter 27. However, to facilitate direct reading of the answer, the source of electrical current should be set to result in a current flow through the third ammeter 27 equal to the unbalanced fixed end moment at support B. In this manner, the other ammeters can be read directly to obtain the final internal moments in the beam.

A circuit can be constructed using the basic circuit described in FIG. 2 to represent as complicated a structure as required in which varying conditions of member arrangement exist. The results obtained with the electrical circuit agree with calculations covering a building which is subject to unbalanced moments at various joints in the structure. The results from the circuit also agree with mathematical calculations on the effect of wind and seismic forces on such a structure.

Although circuits shown in FIG. 2 use resistors, it will be obvious to those skilled in the art that other electrical components such as inductors or capacitors may be substituted for the resistors.

I claim:

1. An electrical circuit for computing the internal distribution of forces in a structure having a plurality of fixed joints separated by spans in the structure, the circuit comprising a plurality of adjustable electrical impedances connected in parallel, each parallel-connected impedance having a value inversely proportional to the stiffness of a respective span of the structure, a two-terminal source of electrical power of a value proportional to an unbalanced fixed end moment around one of the joints, means for connecting one terminal of the source to a point between parallel-connected impedances representing the spans on opposite sides of the said one joint, a common electrical lead, means connecting the other terminal of the source and the ends of the parallel-connected impedances which are remote from the said one terminal to the common lead, and a separate adjustable impedance connected at one end to the common lead and at the other end to a respective intermediate point of each parallel-connected impedance which represents a span having fixed joints at each end, each said separate impedance and the parallel-connected impedance to which it is connected being ganged together so that changing the resistance of one automatically changes the other, means for sensing the current delivered by the source, and means for sensing the current flowing through the parallel-connected impedances.

2. An electrical circuit for computing the internal distribution of forces in a structure having a plurality of fixed joints separated by spans in the structure, the circuit comprising a plurality of adjustable electrical impendances connected in parallel, each parallel-connected impedance having a value inversely proportional to the stiffness of a respective span of the structure, a two-terminal source of electrical power of a value proportional to an unbalanced fixed end moment around one of the joints, means for connecting one terminal of the source to a point between parallel-connected impedances representing the spans on opposite sides of the said one joint, a common electrical lead, means connecting the other terminal of the source and the ends of the parallel-connected impedances which are remote from the said one terminal to the common lead, and a separate impedance connected at one end to the common lead and at the other end to a respective midpoint of each parallel-connected impedance which represents a span having fixed joints at each end, each said separate impedance being equal to one-half the value of the respective parallel-connected impedance to which it is connected, each said separate impedance and the parallel-connected impedance to which it is connected being ganged together so that changing the resistance of one automatically changes the resistance of the other, means for sensing the current delivered by the source, and means for sensing the current flowing through the parallel-connected impedances.

3. An electrical circuit for computing the internal distribution of forces in a structure having a plurality of fixed joints separated by spans in the structure, the circuit comprising a plurality of electrical impedances connected in parallel, each parallel-connected impedance having a value inversely proportional to the stiffness of a respective span of the structure, a two-terminal source of electrical power of a value proportional to an unbalanced fixed end moment around one of the joints, means for connecting one terminal of the source to a point between parallel-connected impedances representing the spans on opposite sides of the said one joint, a common electrical lead, means connecting the other terminal of the source and the ends of the parallel-connected impedances which are remote from the said one terminal to the common lead, and a separate impedance connected at one end to the common lead and at the other end to a respective intermediate point of each parallel-connected impedance which represents a span having fixed joints at each end, each said separate impedance and the respective parallel-connected impedance to which it is connected forming a T-connected branch of impedances, means for adjusting the value of the impedance of each branch in the T, the adjusting means in each branch of the T being ganged together, means for sensing the current delivered by the source, and means for sensing the current flowing through the parallel-connected impedances.

4. An electrical circuit for computing the internal distribution of forces in a structure having a plurality of fixed joints separated by spans in the structure, the circuit comprising a plurality of electrical impedances connected in parallel, each parallel-connected impedance having a value inversely proportional to the stiffness of a respective span of the structure, a two-terminal source of electrical power of a value proportional to an unbalanced fixed end moment around one of the joints, means for connecting one terminal of the source to a point between parallel-connected impedances representing the spans on opposite sides of the said one joint, a common electrical lead, means connecting the other terminal of the source and the ends of the parallel-connected impedances which are remote from the said one terminal to the common lead, and a separate impedance connected at one end to the common lead and at the other end to a respective intermediate point of each parallel-connected impedance which represents a span having fixed joints at each end, each said separate impedance and the respective parallel-connected impedance to which it is connected forming a T-connected branch of impedances, means for adjusting the value of the impedance of each branch in the T, switching means for each separate impedance for connecting it to and disconnecting it from the circuit, means for sensing the current delivered by the source, and means for sensing the current flowing through the parallel-connected impedances.

References Cited

UNITED STATES PATENTS

| 2,520,428 | 8/1950 | Nilakantan | 235—179 X |
| 2,601,382 | 6/1952 | Fubini | 324—65 X |
| 2,721,696 | 10/1955 | Eisler et al. | 235—179 |
| 2,802,624 | 8/1957 | Kayan | 235—184 |
| 2,965,703 | 12/1960 | Loughlin | 235—179 X |
| 3,250,905 | 5/1966 | Schroeder et al. | 235—197 |

MALCOLM A. MORRISON, *Primary Examiner.*

I. KESCHNER, J. RUGGIERO, *Assistant Examiners.*